United States Patent [19]

Sanpei et al.

[11] 4,395,435

[45] Jul. 26, 1983

[54] METHOD FOR MANUFACTURING INFORMATION RECORDING MEDIUM

[75] Inventors: Hideo Sanpei, Hiratsuka; Kunio Matsuno, Yokosuka; Shyoji Hirano; Katuya Kumagai, both of Yokohama, all of Japan

[73] Assignee: Tokyo Shibaura Denki Kabushiki Kaisha, Kawasaki, Japan

[21] Appl. No.: 355,114

[22] Filed: Mar. 5, 1982

[30] Foreign Application Priority Data

Mar. 11, 1981 [JP] Japan .................................. 56-34837

[51] Int. Cl.³ ............................................. C11B 23/00
[52] U.S. Cl. ...................................... 427/38; 427/40; 427/41
[58] Field of Search ............................. 427/38, 41, 40

[56] References Cited

U.S. PATENT DOCUMENTS 4,018,945  4/1977  Mehalso ................................ 427/41

Primary Examiner—James R. Hoffman
Attorney, Agent, or Firm—Oblon, Fisher, Spivak, McClelland & Maier

[57] ABSTRACT

An information recording medium is manufactured while placing, in a reaction region, a substrate on the surface of which is recorded information in the form of an indented pattern and the surface of which exhibits electrical conductivity. A plasma generating gas is introduced into a plasma generating region which is isolated from the reaction region. The plasma generating gas is activated by microwaves to generate a plasma. The plasma from the plasma generating region and an organic monomer are introduced into the reaction region independently of each other to initiate polymerization of the organic monomer. A dielectric layer of a polymer of the monomer and of a uniform, small thickness is formed along the indented pattern of the target.

12 Claims, 2 Drawing Figures

METHOD FOR MANUFACTURING INFORMATION RECORDING MEDIUM

BACKGROUND OF THE INVENTION

I. Field of the Invention

The present invention relates to a method for manufacturing an information recording medium and, more particularly, to a method for forming a dielectric layer for an information recording medium of the type from which information is reproduced according to the stray capacitance.

II. Description of the Prior Art

Video discs in which video signals are recorded at a high density have recently been developed and are already in the process of actual application. As an example of a video disc of this type, there is known a video disc from which information is reproduced according to changes in the stray capacitance. A video disc of this type is manufactured by forming pits corresponding to information in the surface layer of a disc-shaped substrate of a resin, forming a conductive layer on the surface of the substrate including the pits, and forming a dielectric layer of an organic polymer on the conductive layer. In order to reproduce information recorded on this video disc, a playback stylus with a flat front surface and an electrode on its one side surface is brought into contact with the surface of the video disc such that the front surface of the stylus faces the surface of the video disc. The video disc and the playback stylus are moved relative to each other. Then, changes in the capacitance between the disc and the electrode are detected which depend upon the presence or absence of the pits on the surface of the disc.

In video discs of the types from which information recorded as an indented pattern is reproduced in accordance with changes in the stray capacitance, including the video disc as described above, the dielectric layer which is formed to produce the stray capacitance is required to be uniformly extremely thin and void of defects.

In order to form such a dielectric layer, there are conventionally known a method involving spin coating and curing a thermosetting or photocuring resin paint, a method involving placing a disc-shaped substrate in an atmosphere containing a monomer and polymerizing the monomer by glow discharge, a method involving forming a polymer on the substrate by sputtering, and the like.

However, the method using a resin paint has several drawbacks. For example, the dielectric layer tends to be formed relatively thick. The pits are buried by the paint. The substrate may be swollen by the solvent. In addition, it is difficult to uniformly coat the resin paint. According to the method which utilizes glow discharge, parallel electrodes are disposed in an atmosphere containing a monomer with a relatively small distance therebetween. The substrate is placed on one electrode. A voltage is applied across both electrodes to cause glow discharge to thereby generate a plasma. The monomer is thus polymerized to form a polymer layer on the substrate. According to the method utilizing glow discharge, since the field of activation of the monomer (field of plasma generation) is the same as the field of polymerization, the polymer layer formed on the surface of the substrate is constantly exposed to the discharge. As a result, fine pin holes tend to form. Furthermore, a polymer layer of uniform thickness may not be obtained unless the distance between the parallel electrodes is constant. The reaction is strong and is hard to control.

When a polymer is sputtered, it evaporates in the form of a monomer or an oligomer such as a dimer, and polymerizes on the substrate or before it reaches the substrate. For this reason, the polymer is deposited on the surface of the substrate in the form of a rough network, spots, islands or masses. In order to form a uniform layer, the layer must be made considerably thick. Such a thick layer is not suitable as a dielectric layer for a video disc.

SUMMARY OF THE INVENTION

It is an object of the present invention to provide a method for manufacturing an information recording medium which has a dielectric layer which is of a uniform and sufficiently small thickness and has no defects such as pin holes.

The method of the present invention utilizes plasma-initiated polymerization. The generation of the plasma and the polymerization are performed in regions which are isolated from each other. According to the present invention, a substrate on which information is recorded in the form of an indented pattern on the surface thereof and which exhibits electrical conductivity at the surface thereof is placed in a reaction region. A plasma generating gas is introduced into the plasma generating region which is isolated from the reaction region. In the plasma generating region, microwave energy is applied to the gas to activate it and to generate a plasma. The plasma generated in this manner and an organic monomer are introduced into the reaction region separately. Upon contact with the plasma, the organic monomer starts to polymerize, so that the dielectric layer of the polymer of the monomer is formed along the indented pattern on the surface of the substrate.

Since the plasma generating region and the polymerization reaction region are isolated from each other, polymerization of the monomer progresses relatively mildly, so that control of the polymerization becomes relatively easy. Accordingly, with the method of the present invention, a dielectric layer of uniform and small thickness may be easily formed. Since the polymer formed in the polymerization reaction region is not exposed to the plasma generating discharge as in the plasma-initiated polymerization utilizing glow discharge, a dielectric layer void of defects such as pin holes can be formed. The above and other advantages of the present invention will become more apparent from the following description.

DETAILED DESCRIPTION OF THE PREFERRED EMBODIMENTS

Figure 1:
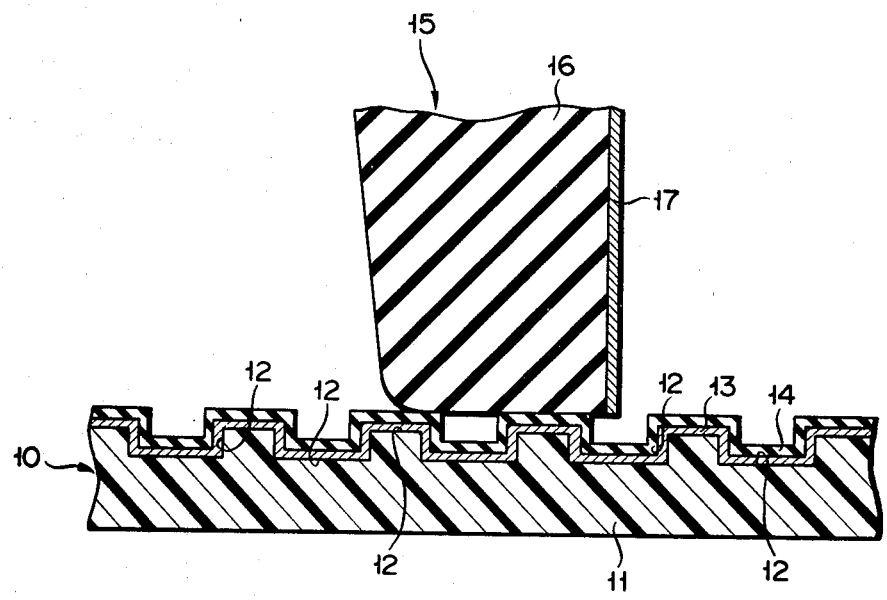
FIG. 1 is a schematic sectional view of a video disc of the type from which information is reproduced according to the stray capacitance.

Before describing the present invention in detail, a video disc of the type from which information is reproduced according to the stray capacitance will be described as an example of an information recording medium. As shown in FIG. 1, this video disc 10 has a disc body 11 of a thermoplastic resin such as polyvinyl chloride or a vinyl chloride-vinyl acetate copolymer. A plurality of pits 12 of the same depth and corresponding to information are formed in a spiral form in the surface layer of the disc body 11. An electrically conductive material such as aluminum is deposited along the indented pattern defined by the pits to cover the overall surface of the disc body 11, thus forming a conductive layer 13. A dielectric layer 14 is formed on the conductive layer 13.

In order to reproduce information, the front surface of a playback stylus 15 is brought into contact with the surface of the video disc 10. The playback stylus 15 has a stylus main body 16 having a flat front surface and made of an insulator such as diamond or sapphire, and also has an electrode 17 formed on the side wall of the stylus main body 16. The video disc 10 is rotated to move it relative to the playback stylus 15. The stray capacitance between the electrode 17 of the playback stylus 15 and the conductive layer 13 of the disc 10 changes according to the length of a pit and the length of the rib adjacent to the pit, the lengths of the pit and rib being measured in the turning direction of the disc 10. This change in the stray capacitance is detected by a known means through the electrode 17 and is reproduced as a video signal.

In a video disc of this type, the dielectric layer 14 serves to define the stray capacitance between the electrode 17 and the conductive layer 13. As has been described, the dielectric layer is required to have a uniform and small thickness (in general, a thickness of 300 to 1,500 Å), not to bury the pits, and to have no defects such as pin holes. The present invention provides a method for forming such a dielectric layer.

Figure 2:
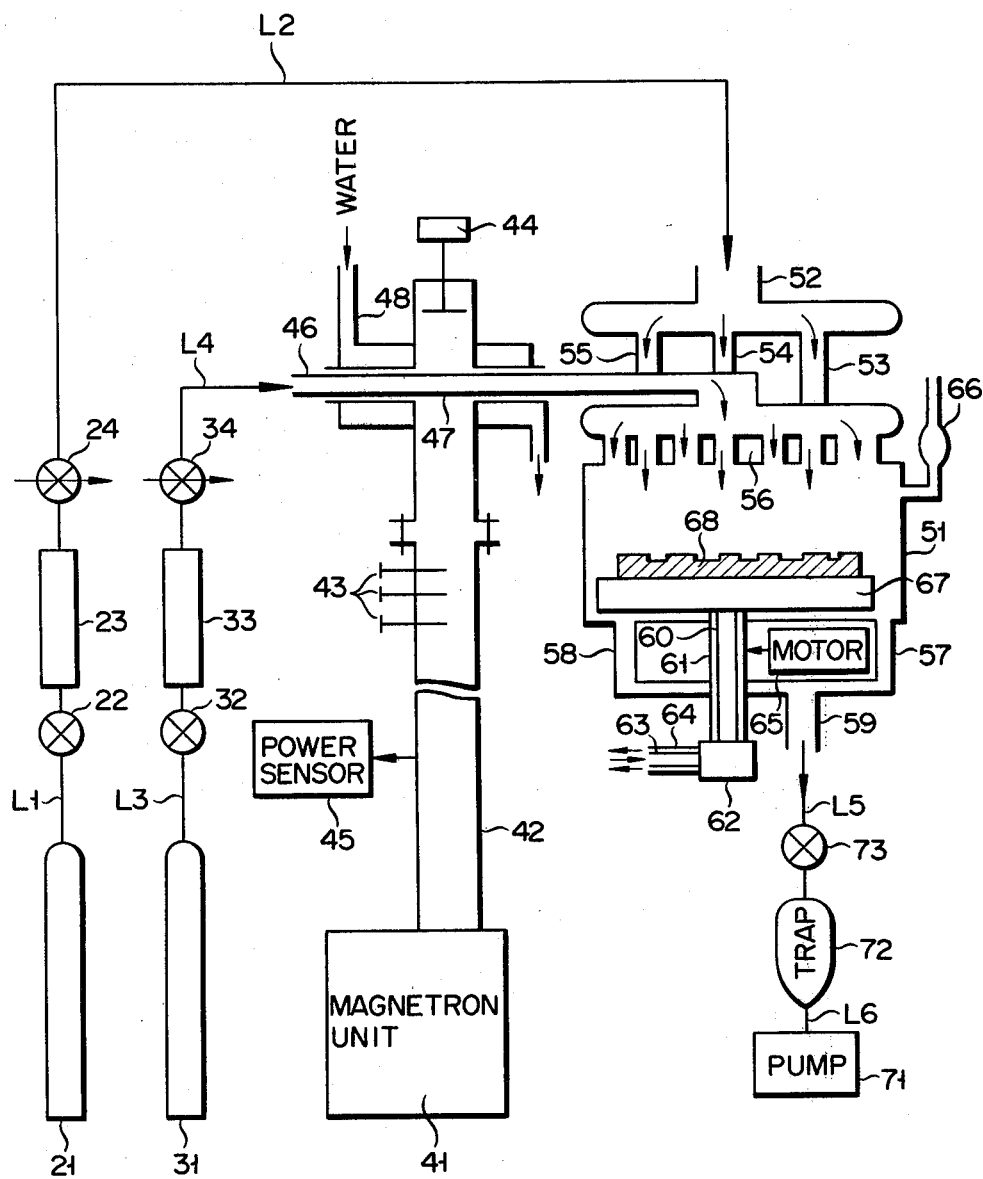
FIG. 2 is a view showing the configuration of a dielectric layer forming apparatus for practicing the method of the present invention.

FIG. 2 is a view showing a dielectric layer forming apparatus for practicing the method of the present invention. The apparatus includes an organic monomer feed system, a plasma generating gas feed system, a plasma generating system, a polymerization reaction system, and an evacuating system.

The organic monomer feed system has a tank 21 storing an organic monomer vapor, a flow meter 23 communicating with the tank 21 via a line L1 through a valve 22, and a needle valve 24 connected to the flow meter 23 via a line L2. The organic monomer feed system feeds a gaseous organic monomer as a raw material to the polymerization reaction system via the line L2. Similarly, the plasma generating gas feed system has a tank 31 holding a plasma generating gas, a flow meter 33 communicating with the tank 31 via a line L3 through a valve 32, and a needle valve 34 connected to the flow meter 33 via a line L4. The plasma generating gas feed system feeds the plasma generating gas to the plasma generating system via a line L4.

The plasma generating system includes a magnetron unit 41, a waveguide 42 connected to the magnetron unit 41, and a tube 46 which crosses the rear end portion of the waveguide 42 and defines a plasma generating region 47. To the waveguide 42 is connected a power sensor 45 for monitoring the microwave power. A three stab tuner 43 is also arranged in the waveguide 42. A plunger 44 is disposed at the rear end of the waveguide 42. By means of the plunger 44 and the tuner 43, microwaves generated by the magnetron unit 41 are impedance-matched so as to generate standing waves at the plasma generating region 47. The tube 46 is surrounded by a water-cooling cylinder 48 in which water flows for dissipating heat generated at the plasma generating region 47. The plasma generating gas is fed to the tube 46 through the line L4.

The polymerization reaction system includes a reaction chamber 51 which is disposed isolated from the plasma generating region 47. An inlet tube 52 of the monomer is disposed at the top of the reaction chamber 51. The inlet tube 52 communicates with the reaction chamber 51 through branch tubes 53, 54 and 55. The tube 46 also communicates with the top of the reaction chamber 51 so as to introduce the plasma generated in the plasma generating region 47 to the reaction chamber 51 therethrough. The introduced plasma and monomer pass through a porous plate 56 arranged at the upper portion of the reaction chamber and are brought into uniform contact with a target 68 placed on a table 67 inside the reaction chamber 51. The hollow table 67 is liquid-tightly connected to the upper ends of double tubes 60 and 61 which are liquid-tightly sealed in relation to the reaction chamber. The other ends of the double tubes 60 and 61 are rotatably connected to a joint 62. Through this joint 62, the double tubes 60 and 61 are connected to double tubes 63 and 64, respectively. Water is circulated to cool the target 68 by introducing water into the table 67 from the inner tube 63 through the inner tube 60 and exhausting water from the outer tube 64 through the outer tube 61. The double tubes 60 and 61 are rotated by a motor 65 to thereby rotate the table 67 and, hence, the target 68. A capacitance manometer 66 is connected to the reaction chamber.

To the bottom wall of the reaction chamber 51 communicate a plurality of branch tubes (denoted by 57 and 58 in FIG. 2) at the positions surrounding the table 67. These branch tubes 57 and 58 are joined to an evacuating tube 59. The evacuating tube 59 is connected through a line L5 to the evacuating system including a valve 73, a trap 72, and an evacuating pump 71 such as an oil circulation type vacuum pump which is connected to the trap 72 through a line L6.

In order to form the dielectric layer 14 shown in FIG. 1 by the apparatus shown in FIG. 2, the evacuating pump 71 is operated first to evacuate the interior atmosphere of the reaction chamber 51 to a pressure of $10^{-3}$ Torr or less. Next, a plasma generating gas such as argon, nitrogen, or helium is introduced into the plasma generating region 47 from the storage tank 31 through the valve 32, the flow meter 33 and the needle valve 34. The plasma generating gas flow is adjusted with the flow meter 32, the needle valve 34 and the capacitance manometer 66 so that the pressure inside the reaction chamber 51 is 1 to 3 Torr and the flow rate of the gas is about 100 to 300 ml/min.

The magnetron unit 41 is activated to generate the microwaves and the plasma is generated in the region 47. The microwaves are impedance-matched by the three-stab tuner 43 and the plunger 44, and are transmitted to the plasma generating region 47. When the plasma generating gas is discharged in the plasma generating region 47 and the discharge is stabilized, the vapor of an organic compound (monomer) is introduced into the reaction chamber 51 from the storage tank 21 through the flow meter 23 and the needle valve 24. The power of the magnetron unit is preferably within the range of 200 to 800 W, and more preferably about 300 to about 500 W. The flow rate of the monomer gas is, preferably, about 1 to 10 ml/min. The monomer gas thus introduced into the reaction chamber is mixed with the plasma gas which has been activated by passing through the plasma generating region 47. Thus, polymerization starts, and the dielectric layer is formed on the conductive layer of the target 68 such as the substrate shown in FIG. 1 which is placed in the reaction chamber 51. In order to form a uniform dielectric layer 14, it is preferable to rotate the target 68 placed on the table 67 by rotating the double tubes 60 and 61 by the motor 65. Furthermore, in order to prevent the deformation, due to overheating, of pits formed on the target 68, it is preferable to circulate water through the table 67 to cool the target 68.

Examples of the vapor of the organic compound (monomer) include halides (e.g., tetrafluoroethylene, vinylidene fluoride, and methylene chloride), silane compounds (e.g., trimethylsilane, triethylsilane, and tetraethylenesilane), styrene compounds (e.g., styrene and methylstyrene), and alkane or cycloalkane compounds (e.g., ethylene, 1,3-butadiene, trans-2-heptene and cyclohexene). Mixtures of these compounds may also be used. Among these compounds, tetrafluoroethylene and styrene are particularly preferable. Halide monomers are preferable in terms of good adhesion to the conductive layer. However, adhesion to the conductive layer may be improved even when a non-halide compound is used, if 1 to 20% of an organic halide (e.g., a halide monomer or methylene chloride as described above) is added based on the weight of the non-halide monomer.

The thickness of the dielectric layer 14 formed in this manner can be controlled by the power of the magnetron unit 41, the flow rate of the monomer gas, the polymerization reaction time (this may be controlled by the time during which the monomer gas is flown and which is generally 3 to 40 minutes, depending on the volume of the reaction chamber and the other chamber conditions) and the like. It is easy to set conditions suitable for obtaining a dielectric layer of about 300 to 1,500 Å thickness which is suitable for a video disc by conducting simple preliminary experiments.

The dielectric layer formed in this manner has advantages: (1) no pin holes are formed; (2) the layer is an extremely thin layer and the film thickness can be controlled; (3) the layer has a highly cross-linked structure and is excellent in abrasion resistance; (4) the layer is excellent in adhesion to the conductive layer; and (5) the layer may be formed to a uniform thickness on a surface with a complex indented pattern. Thus, according to the present invention, it is possible to manufacture an information recording medium such as a video disc which is excellent in reproducing performance, durability, and reliability.

EXAMPLES 1-8 AND COMPARATIVE EXAMPLES 1-3

Video discs on which video information is recorded in the form of pits were manufactured, using an apparatus similar to that shown in FIG. 2 under the same conditions as shown in Table 1 below. For the purpose of comparison, the dielectric layers were formed by glow discharge, spin coating, and sputtering. The conditions for forming these dielectric layers are also shown in Table 1 below.

Various characteristics of the video discs manufactured in this manner were examined. The obtained results are shown in Table 2 below.

TABLE 1

| | | | Disc Preparing Conditions | | | | | |
|---|---|---|---|---|---|---|---|---|
| | | | Dielectric Layer Formation Conditions | | | | | |
| Example | Disc Body | Conductive Layer | Plasma Generating Gas | Flow Rate of Plasma Generating Gas [ml/min] | Monomer Gas | Flow Rate of Monomer Gas [ml/min] | Total Pressure in Reaction Chamber [Torr] | Microwave Output Power [W] | Reaction Time [min] |
| Example 1 | Vinyl Chloride Resin (Degree of Polymerization: 700) | Aluminum Deposited Film (500 Å) | Argon | 110 | Tetrafluoroethylene | 1 | 1.1 | 300 | 20 |
| Example 2 | Vinyl Chloride Resin (Degree of Polymerization: 700) | Aluminum Deposited Film (500 Å) | Nitrogen | 285 | Tetrafluoroethylene | 9 | 2.9 | 500 | 10 |
| Example 3 | Vinyl Chloride Resin (Degree of Polymerization: 700) | Aluminum Deposited Film (800 Å) | Helium | 158 | Tetrafluoroethylene | 6 | 1.8 | 450 | 10 |
| Example 4 | Vinyl Chloride Resin (Degree of Polymerization: 700) | Aluminum Deposited Film (500 Å) | Helium | 160 | Styrene | 5 | 2.0 | 430 | 10 |
| Example 5 | Vinyl Chloride-Vinyl Acetate Copolymer (Degree of Polymerization: 700) | Aluminum Deposited Film (800 Å) | Argon | 250 | Styrene | 7 | 2.4 | 470 | 10 |
| Example 6 | Vinyl Chloride Resin (Degree of Polymerization: 700) | Aluminum Deposited Film (500 Å) | Argon | 80 | Tetrafluoroethylene | 17 | 0.8 | 200 | 5 |
| Example 7 | Vinyl Chloride Resin (Degree of Polymerization: 700) | Aluminum Deposited Film (500 Å) | Argon | 350 | Tetrafluoroethylene | 22 | 3.7 | 600 | 5 |
| Example 8 | Vinyl Chloride Resin (Degree of Polymeriza- | Aluminum Deposited Film | Helium | 400 | Styrene | 0.5 | 4.1 | 400 | 20 |

TABLE 1-continued

| | | | Disk Preparing Conditions | | | | | | |
|---|---|---|---|---|---|---|---|---|---|
| | | | | Dielectric Layer Formation Conditions | | | | | |
| Example | Target | Conductive Layer | Plasma Generating Gas | Flow Rate of Plasma Generating Gas [ml/min] | Monomer Gas | Flow Rate of Monomer Gas [ml/min] | Total Pressure in Reaction Chamber [Torr] | Microwave Output Power [W] | Reaction Time [min] |
| | tion: 700) | (800 Å) | | | | | | | |
| Comparative Example 1 | Vinyl Chloride Resin (Degree of Polymerization: 700) | Aluminum Deposited Film (800 Å) | Argon | 250 | Styrene | 5 | 2.3 | Glow Discharge Polymerization | 10 |
| Comparative Example 2 | Vinyl Chloride Resin (Degree of Polymerization: 700) | Aluminum Deposited Film (500 Å) | Layer is formed by spin-coating and photocuring polymethylmethacrylate | | | | | | |
| Comparative Example 3 | Vinyl Chloride Resin (Degree of Polymerization: 700) | Aluminum Deposited Film (500 Å) | Layer is formed by sputtering polytetrafluoroethylene | | | | | | |

TABLE 2

| | Disc Characteristics | | | | | | |
|---|---|---|---|---|---|---|---|
| | Electric Characteristics | | | Resistance to Heat and Humidity; (left to stand at 50° C. and 90% RH for 96 H) | Abrasion Resistance (Still Image Holding Time in H) | Adhesion (Scotch Tape Test) | SEM Observation of Disc Surface |
| Example | SN Ratio [dB] | Output [mV] | Dropout | | | | |
| Example 1 | 52 | 1400 | Small | O | >1 | O | Smooth Surface |
| Example 2 | 49 | 1000 | Relatively Great | O | >1 | Δ | Slightly Indented Surface |
| Example 3 | 51 | 1300 | Small | O | >1 | O | Smooth Surface |
| Example 4 | 51 | 1200 | Small | O | >1 | O | Smooth Surface |
| Example 5 | 50 | 1000 | Relatively Great | O | >1 | Δ | Smooth Surface |
| Example 6 | 46 | 600 | Relatively Great | O | 0.6 | O | Significantly Indented Surface |
| Example 7 | 49 | 900 | Relatively Great | Δ | >1 | Δ | Significantly Indented Surface |
| Example 8 | 50 | 1100 | Small | O | 0.8 | O | Too Thin Layer |
| Comparative Example 1 | 42 | 400 | Great | O | 0.3 | Δ | Pin Holes; Indented Surface |
| Comparative Example 2 | 35-39 with Fluctuations | 200-400 with Fluctuations | Small | O | Scratches Formed by Stylus during Playback | O | Nonuniform Film Thickness |
| Comparative Example 3 | 40 | 400 | Great | X | 0.5 | Δ | Significantly Indented Surface |

*Note:
In Table 2, O means "good", Δ "usual", and X "bad".

As may be seen from the above results, the video discs manufactured in the examples of the present invention are superior to those manufactured by the conventional methods from the overall point of view. It is seen that particularly excellent video discs can be manufactured when the monomer flow rate is set to 1 to 10 ml/min, the flow rate of the plasma generating gas is set to 100 to 300 ml/min, and the total pressure of the reaction chamber is set to 1 to 3 Torr (Examples 1 to 5).

What we claim is:

1. A method for manufacturing an information recording medium, comprising:

placing, in a reaction region, a target on a surface of which is recorded information in a form of an indented pattern and the surface of which exhibits electrical conductivity;

introducing a plasma generating gas into a plasma generating region isolated from said reaction region, activating the plasma generating gas by microwaves to generate a plasma; and introducing the plasma from said plasma generating region and an organic monomer into said reaction region independently of each other to initiate polymerization of the organic monomer, thereby forming a dielectric layer of a polymer of the monomer and of a uniform, small thickness along the indented pattern of said target.

2. A method according to claim 1, wherein the organic monomer is introduced into said reaction region at a flow rate of 1 to 10 ml/min.

3. A method according to claim 2, wherein the organic monomer is a halide.

4. A method according to claim 3, wherein the halide is a member selected from the group consisting of tetrafluoroethylene, vinylidene fluoride, methylene chloride and mixtures thereof.

5. A method according to claim 2, wherein the organic monomer is a non-halide compound.

6. A method according to claim 5, wherein the non-halide compound is a member selected from the group consisting of silane compounds, styrene compounds, alkane compounds, cycloalkane compounds and mixtures thereof.

7. A method according to claim 1, wherein the organic monomer comprises the non-halide compound and 1 to 20% of an organic halide based on the weight of the non-halide compound.

8. A method according to any one of claims 1 to 7, wherein the plasma is introduced into said reaction region at a flow rate of 100 to 300 ml/min.

9. A method according to claim 8, wherein the plasma generating gas is a member selected from the group consisting of argon, nitrogen and helium.

10. A method according to claim 8, wherein a total pressure of said reaction region is held at 1 to 3 Torr.

11. A method according to claim 10, wherein said target is rotated during polymerization.

12. A method according to claim 10, wherein said target is cooled during polymerization.

* * * * *